March 14, 1967

R. D. SIMONTON 3,308,597

GRID-LIKE ARTICLE AND APPARTUS FOR
AND METHOD OF MAKING SAME

Filed Jan. 3, 1964

INVENTOR.
ROBERT D. SIMONTON

BY

*Henry A. Manzello Jr.*
ATTORNEY

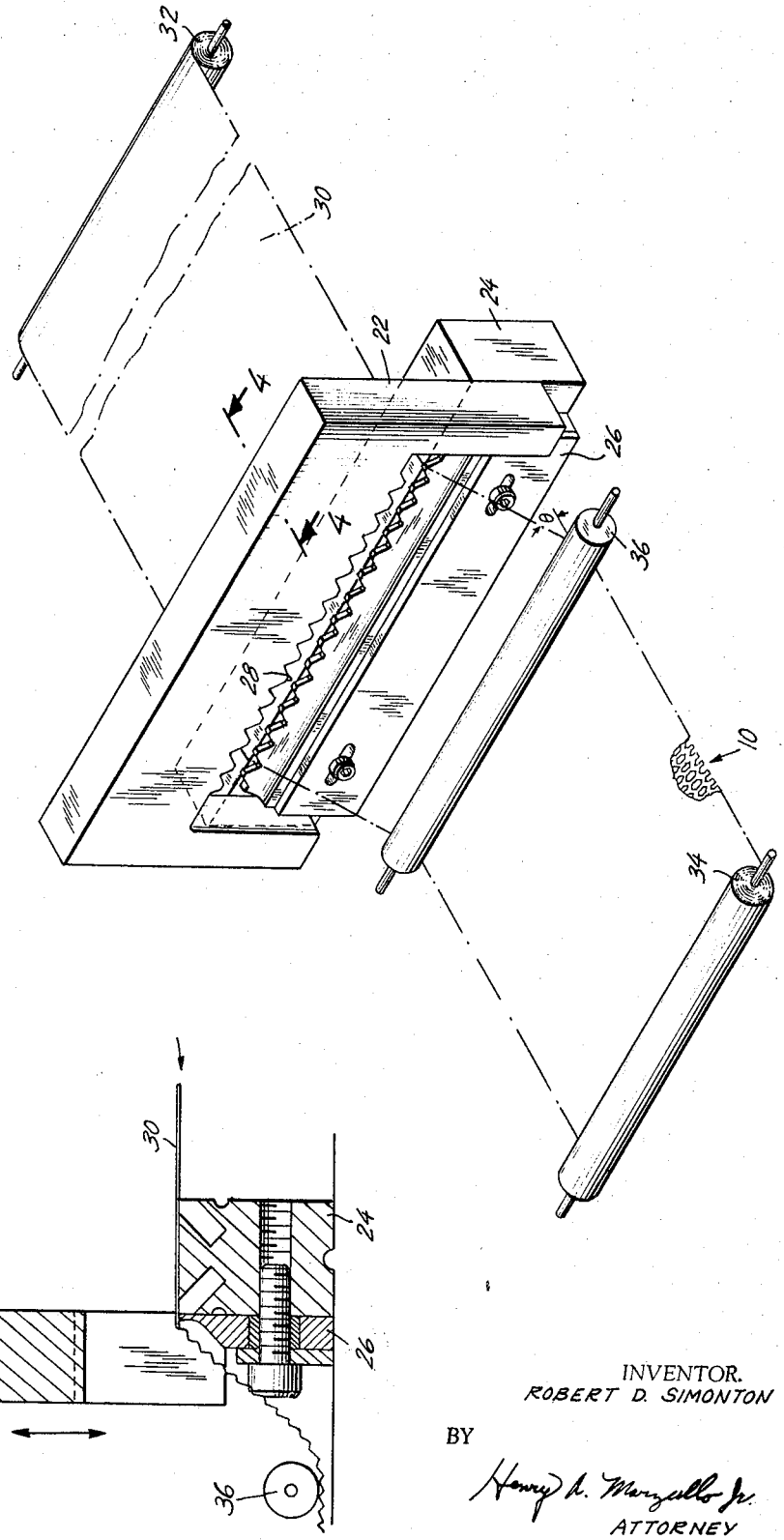

United States Patent Office 3,308,597
Patented Mar. 14, 1967

3,308,597
GRID-LIKE ARTICLE AND APPARATUS FOR
AND METHOD OF MAKING SAME
Robert D. Simonton, Bay Village, Ohio, assignor to
Union Carbide Corporation, a corporation of New
York
Filed Jan. 3, 1964, Ser. No. 335,466
3 Claims. (Cl. 52—635)

This invention relates to a grid-like article and to an apparatus for and method of making the grid-like article. More particularly, the invention refers to a novel method of producing a grid-like article which is akin to an expanded metal grid from rolled or coiled strip material, such as metal foil and the like, and which while being slitted is simultaneously drawn and made into a grid-like article without reducing the width of the original strip material.

In the manufacture of thin flat electrodes for use in batteries of the alkaline storage type, it is generally the practice to support the active electrode material by means of a grid structure such as a wire screen mesh or an expanded metal. The criteria for such grid structures is large openings which are vertically opened to accomodate a maximum amount of active material. Heretofore, wire screens were not found satisfactory and the expanded metal grids required an additional stretching operation in order to open their normally elongated or diamond shaped openings to a more nearly square shaped opening or pocket. In expanding slitted sheet material in the conventional manner, the webs or bond joints of the material naturally turn so that their surfaces are at an angle to the general surface plane of the sheet. However, even with this further operation the expanded metal still failed to provide a grid structure with a high overall height to strand ratio nor a straight bond joint more nearly perpendicular to the surface plane of the formed metal. This type of opening or pocket and this bond joint or web is most desirable inasmuch as it provides larger regions bound by the grid structure to contain the active powder with a minimum of grid material per unit of volume and since it lends itself to readily lock the particles in the openings upon being compressed between suitable rollers.

It is therefore the principal object of the present invention to provide a novel and improved grid-like article for use primarily in the fabrication of electrodes of the type utilized in alkaline storage batteries.

Another object of the invention is to provide such an improved grid-like article which is inexpensive and easy to manufacture in that only one step or operation is necessary to fabricate such a grid.

A further object of the invention is to provide an apparatus of the character mentioned hereinabove in which slits are cut or punched cleanly and accurately in the desired location without tearing the sheet material and then the strands formed by the slits are drawn so as to produce an essentially uniform grid-like article.

It is a further object of the invention to provide an apparatus of the character mentioned in which the material to be slitted and drawn is fed continuously to the apparatus and the finished grid-like article is delivered continuously at the same time thereof and without a reduction in width of the sheet material.

A still further object of the invention is to provide an apparatus of the character mentioned which is capable of rapid operation upon varied widths of rolled or coiled strip material.

Still another object of the invention is to provide a process for producing the improved grid-like article which is simple and adapted to a single, continuous operation.

Other objects and advantages of this invention will become apparent as the following description is read in conjunction with the accompanying drawings; in which:

FIG. 3 is a perspective view of the apparatus of the invention;

FIG. 4 is a sectional view of a portion of the apparatus, taken along line 4—4 of FIG. 3;

Figure 1:
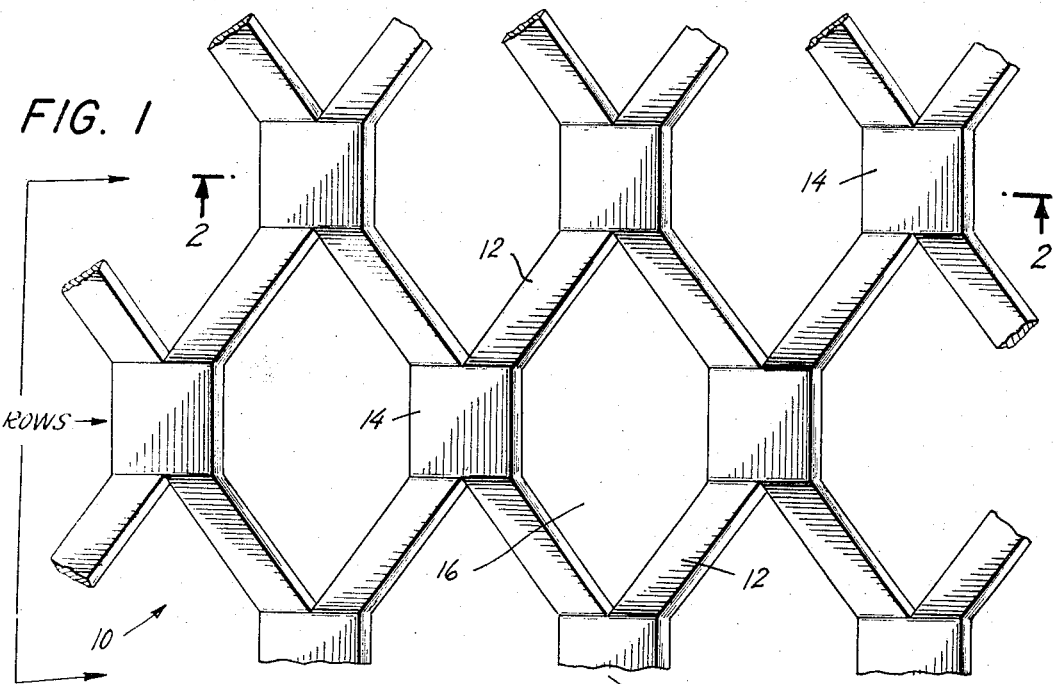
FIG. 1 is a plan view of the grid-like article of the invention.

Referring to the drawings and particularly to FIGURES 1, 2, 5 and 6, the improved grid is generally indicated by the reference numeral 10. The grid structure 10 comprises a continuous network of strands 12 integrally joined or connected as at 14 by substantially flat and straight bond joints. In comparison to conventional expanded metal wherein the grid openings are elongated or "diamond" shaped, the grid structure of the invention is composed of a plurality of nearly square openings or pockets 16, these openings providing larger regions bound by the grid to contain the active electrode powders with a minimum of grid material; thus an electrode structure formed therefrom is characterized by a high volumetric efficiency.

Figure 2:
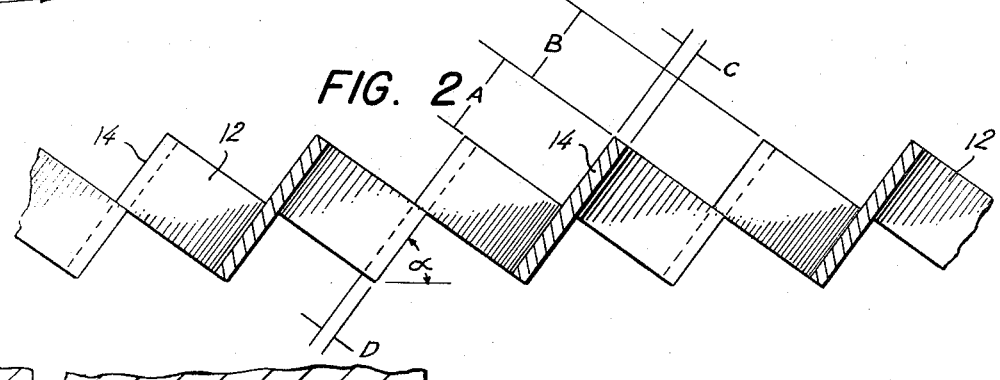
FIG. 2 is a sectional view of the grid taken along line 2—2 of FIG. 1.

As clearly shown in FIG. 2, the bond joints 14 are disposed at a steep angle ($\alpha$) with a horizontal reference plane of the grid structure so that the grid openings 16 are "up and open" to receive a maximum amount of material deposited thereon. The angle $\alpha$ may be suitably anywhere from between about 45 degrees to about 90 degrees. A preferred range is from about 70 degrees to about 80 degrees. An even more preferred range is from 80 degrees to 90 degrees. Although this grid structure 10 appears to resemble a honeycomb structure, it differs therefrom primarily in that its strands 12 do not fully share the same web as in a typical honeycomb cell construction and of course, as noted above, the web or bond joint 14 is not normal to the surface plane of the material. In fact, although the bond joints 14 are integrally part of each connection between the strands 12 of each hexagonally shaped pocket 16, they do retain some individuality since the bond joints 14 can be considered as a small panel composed of an upper segment 18 and a lower segment 20. This is more readily apparent from FIG. 6.

Figure 6:
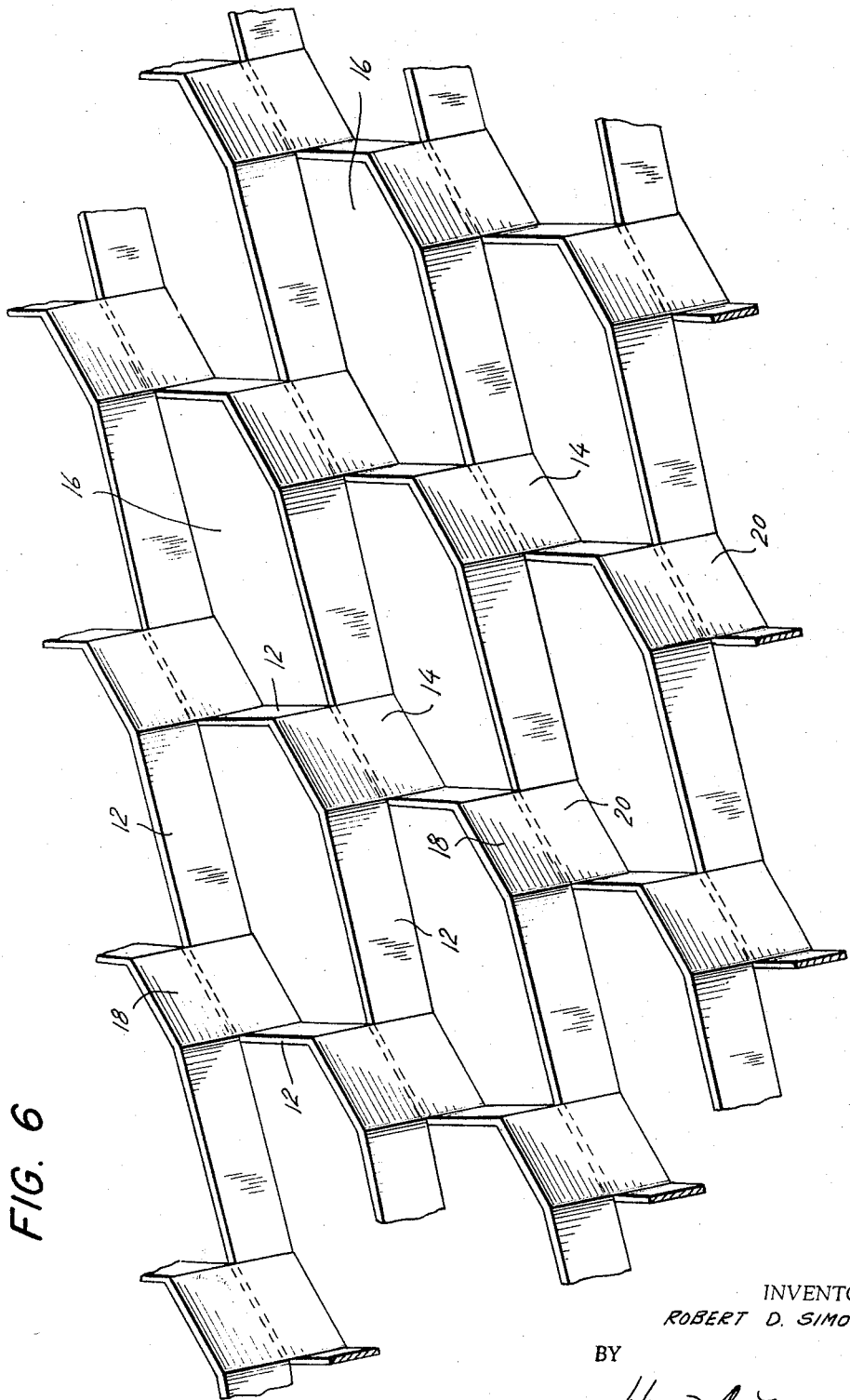
FIG. 6 is a fragmental view in perspective of the grid-like article of the invention.

As shown in FIGURES 1 and 6, the grid-like article comprises a continuous network of interconnecting strand walls and bond joints forming a repeating pattern of pockets 16 arranged in parallel rows and each of the pockets 16 of any row is displaced from any adjacent pocket 16 of the next adjacent row by about one-half the width of the pockets 16. This obviously is attributed to off-setting the rows of the slits by means of the oscillating motion of the blades 22 and 26. The four strand walls of the pockets 16 are joined together by the flat and straight webs or bond joints 14 to form the peripheral boundaries of the pockets 16; two strand walls 12 of each of the pockets 16 reside within a first plane A parallel to an adjacent plane B containing said other two strand walls 12 of said pockets 16, the former two strand walls 12 form one strand wall 12 for an adjacent pocket 16 of each adjacent row and the latter two strand walls 12 form one strand wall for the next adjacent pockets 16 of said adjacent rows. Such planes forming an angle no greater than 45 degrees with the horizontal reference plane of the grid structure.

The bond joints 14 in each of the rows reside in third (C) and fourth (D) planes parallel to each other and perpendicular to the first plane A and the adjacent plane B parallel to said first plane A. One-half of each of the bond joints 14 joining together in pairs as a unit half of the strand walls 12 of a pocket 16 within one row, and the other half of each of the bond joints 14 residing in the next adjacent plane and joining together in pairs as a unit half of the strand walls 12 of the next pocket 16 within the same row such that opposite pairs of strand walls forming the pockets 16 are off set from each other by about one-half the depth of the bond joints 14 and two bond joints 14 of one row and one bond joint 14 from the adjacent rows comprise the boundaries for each of the pockets 16.

Figure 5:
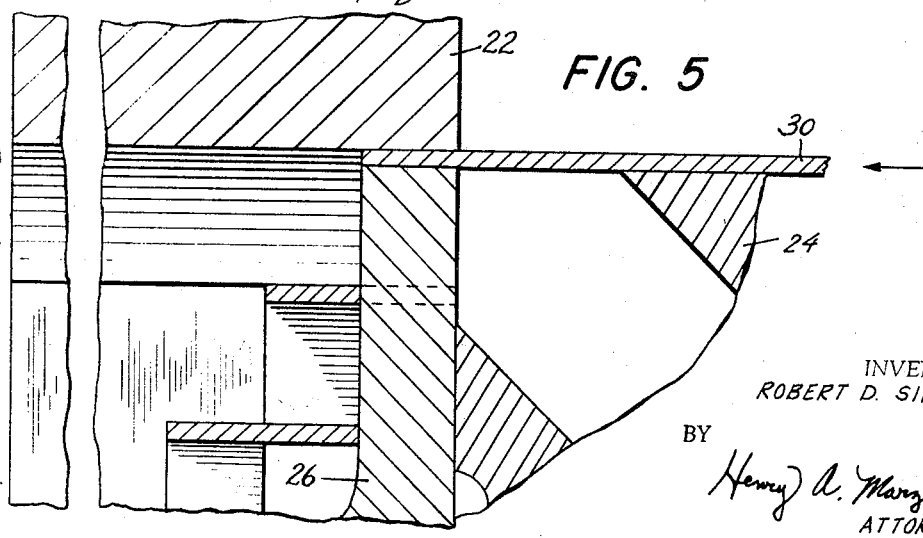
FIG. 5 is a greatly enlarged sectional view of the cutter portion of the apparatus showing the principal slitting and drawing elements.

Referring now to FIGURES 3, 4 and 5, the apparatus of the invention comprises an upper movable cutter blade 22, a lower fixed or stationary cutter blade 24, and a lower movable supporting member 26. The upper movable cutter blade 22 and the lower movable supporting member 26 are provided with a plurality of saw-teeth of a V-notch shape. Both the peaks and valleys of the teeth of the lower movable supporting member 26 are squared off whereas only the cutting edges or tips 28 of the teeth of the upper movable cutter blade 22 are slightly squared off. The material 30, from which the grid structure 10 is composed is a thin flexible material, such as metal foil and the like and it is suitably fed horizontally to the apparatus from a supply roll 32 and removed therefrom as a finished grid structure onto another roller 34. The material 30 enters between the upper movable cutter blade 22 and the lower movable supporting member 26 which is mounted in facial contact with the lower fixed cutter blade 24 and suitably linked to the upper movable cutter blade 22 so that both the upper cutter blade 22 and the lower supporting member 26 may oscillate sideways in synchronism to provide the necessary staggered slit rows. Once the material 30 is slit and drawn simultaneously as will be hereinafter described in greater detail, it then proceeds downward from between the cutter blade 22 and supporting member 26 at an angle of about 135° in an endless series of steps, the depth of which is the unit depth of draw of the metal per stroke of the upper cutter blade 22 and the length of which is the unit length of forward advance of the material 30 between each stroke. Roller 36 is employed as a guide to redirect the material 30 back to a horizontal plane so that the material 30 may be conveniently stored upon said takeup roller 34.

As best shown in FIG. 4, the lower movable supporting member 26 is very thin and no thicker than the unit forward length of advance to which the material 30 is subjected to. The upper movable cutter blade 22 can be very thick to provide rigidity and allow for numerous resharpenings.

In operation, the upper movable cutter blade 22 is raised and lowered in rapid strokes while the metal strip is advanced through the blades a short distance with each stroke, said distance being equal to the depth of the thin, lower supporting member 26. During each upward stroke, the upper cutter blade 22 and the lower supporting member 26 oscillate in unison from one side to the other or in a direction transverse to the feed of the material 30; the upper movable blade 22 or V-notches thereon on each downward stroke shear the material 30 against the stationary cutter blade 24 in the form of short transverse V-slits which are arranged in off-set rows due to the oscillating motion of the blade 22. Simultaneously, the V-notches of the upper cutter blade 22 gradually form the pockets 16 by drawing the strands 12 against the form of the corresponding V-notches of the lower movable supporting member 26. In this manner a supported and perfectly symmetrical bond joint 14 is produced. It is to be noted that the bond joint 14 is substantially straight since it is continuously supported by the lower movable supporting member 26 during the drawing operation. This type of grid structure is most desirable in the manufacture of pressed powdered electrodes since the openings or pockets 16 are disposed "up and open" to receive a maximum amount of active material. It should be noted that before oscillating over to the opposite side the lower member 26 drops downwardly somewhat as the upper blade 22 is raised so that each may clear the intermittent feed of the blank material 30.

For certain decorative grid structures, the off-set or shift may be such that a non-symmetrical grid-like article is produced.

While but a single embodiment of the apparatus of the invention has been illustrated and described, this is by way of example only and various changes and modifications thereof may be made by those skilled in the art within the scope of the invention as the same is set forth in the appended claims. For example, the material may be oscillated in lieu of the cutting blade to provide the necessary off-set rows of V-slits as is generally practiced in the expanded metal art. It should also be apparent that other shaped openings such as an oval pocket may be made and that various decorative designs may be produced on the bond joint, if desired.

What is claimed is:

1. A grid-like article comprising a continuous network of interconnecting strand walls and bond joints forming a repeating pattern of pockets arranged in parallel rows, each of said pockets of any row being displaced from any adjacent pocket of the next adjacent row by about one-half the width of said pocket, the four strand walls of said pockets being joined together by substantially flat and straight bond joints, two strand walls of each of said pockets residing within a first plane parallel to an adjacent plane containing said other two strand walls of said pocket, the former two strand walls each form one strand wall for an adjacent pocket of each adjacent row and the latter two strand walls each form one strand wall for the next adjacent pockets of said adjacent rows, said planes forming an angle no greater than 45 degrees with a horizontal reference plane; said bond joints in each of said rows residing in third and fourth planes parallel to each other and perpendicular to said first plane and the adjacent plane parallel to said first plane, and one-half of each of said bond joints joining together in pairs as a unit half of the strand walls of a pocket within one row and the other half of each of said bond joints residing in the next adjacent plane and joining together in pairs as a unit half of the strand walls of the next pocket within said row such that opposite pairs of strand walls forming said pockets are off-set from each other by about one-half the depth of said bond joints and two bond joints of one row and one bond joint from the adjacent rows comprise the boundaries for each of said pockets.

2. The grid-like article of claim 1 wherein said first and adjacent planes form an angle from about 10 degrees to about 20 degrees with respect to said horizontal reference plane.

3. The grid-like article of claim 1 wherein said pockets are substantially square in shape.

References Cited by the Examiner

UNITED STATES PATENTS

| 1,691,227 | 11/1928 | Cross | 52—670 |
|---|---|---|---|
| 1,897,842 | 2/1933 | Herbest | 52—670 |
| 2,237,051 | 4/1941 | Gersman | 29—6.1 |
| 2,290,486 | 7/1942 | Ballard et al. | 29—6.1 |
| 2,707,995 | 5/1955 | Bibby | 29—6.2 |
| 2,975,263 | 3/1961 | Green et al. | 52—670 |
| 3,099,899 | 8/1963 | Horn et al. | 52—670 |
| 3,162,925 | 12/1964 | Felsenthal | 29—6.2 |
| 3,191,728 | 6/1965 | David | 52—670 X |

HARRISON R. MOSELEY, Primary Examiner.

A. I. BREIER, Assistant Examiner.